US012045013B2

(12) United States Patent
Balague et al.

(10) Patent No.: US 12,045,013 B2
(45) Date of Patent: Jul. 23, 2024

(54) FASTENING PART FOR A HAIRSPRING

(71) Applicant: ROLEX SA, Geneva (CH)

(72) Inventors: Olivier Balague, Fribourg (CH); Dominique Gritti, Cortaillod (CH); Thomas Gyger, Reconvilier (CH); Ondrej Papes, Bâche (CH); Antoine Rime, Nidau (CH)

(73) Assignee: ROLEX SA, Geneva (CH)

( * ) Notice: Subject to any disclaimer, the term of this patent is extended or adjusted under 35 U.S.C. 154(b) by 335 days.

(21) Appl. No.: 16/519,735

(22) Filed: Jul. 23, 2019

(65) Prior Publication Data

US 2019/0369561 A1 Dec. 5, 2019

Related U.S. Application Data

(62) Division of application No. 15/609,749, filed on May 31, 2017, now Pat. No. 10,409,223.

(30) Foreign Application Priority Data

Jun. 1, 2016 (EP) .................................... 16172445

(51) Int. Cl.
*G04B 17/34* (2006.01)
*G04B 17/06* (2006.01)
*G04B 17/32* (2006.01)

(52) U.S. Cl.
CPC ........... *G04B 17/34* (2013.01); *G04B 17/063* (2013.01); *G04B 17/066* (2013.01); *G04B 17/325* (2013.01); *G04B 17/345* (2013.01)

(58) Field of Classification Search
CPC .... G04B 17/06; G04B 17/066; G04B 17/227; G04B 17/34; G04B 43/007
See application file for complete search history.

(56) References Cited

U.S. PATENT DOCUMENTS 224,227 A 2/1880 Rivett
2,057,642 A * 10/1936 Eddison .............. G04B 17/345 368/177

(Continued)

FOREIGN PATENT DOCUMENTS

CH 327018 A 1/1958
CH 357023 A 9/1961

(Continued)

OTHER PUBLICATIONS

Translation of Office Action dated Jun. 4, 2020, issued in counterpart CN Application No. 201710406109.9. (9 pages).

(Continued)

*Primary Examiner* — Edwin A. Leon
*Assistant Examiner* — Jason M Collins
(74) *Attorney, Agent, or Firm* — WHDA, LLP

(57) ABSTRACT

An assembly (300) includes (i) a hairspring (2) made of a paramagnetic alloy including at least one of the following elements: Nb, V, Ta, Ti, Zr and Hf, notably an alloy including the elements Nb and Zr with between 5% and 25% by mass of Zr and an interstitial doping agent including oxygen, and least one fastening part (1; 1'), notably two parts (1; 1'), in particular a stud (1) or a collet (1'), for an end (2*a*; 2*b*) of the hairspring (2), the at least one part (1; 1') having a first portion (10; 10') that is designed to come into contact with the hairspring (2) and that is made of titanium or titanium alloy or of tantalum or tantalum alloy, notably grade 2 titanium or grade 5 titanium.

22 Claims, 7 Drawing Sheets

(56) References Cited

U.S. PATENT DOCUMENTS

| | | | | |
|---|---|---|---|---|
| 3,016,688 | A | 1/1962 | Rueger | |
| 3,121,307 | A | 2/1964 | Greiner | |
| 3,262,261 | A | 7/1966 | Monnin | |
| 3,364,673 | A | 1/1968 | Boult | |
| 3,673,376 | A | 6/1972 | Kullmann | |
| 3,846,612 | A | 11/1974 | Augsburger | |
| 3,868,490 | A | 2/1975 | Aeschlimann et al. | |
| 5,881,026 | A | 3/1999 | Baur et al. | |
| 8,147,127 | B2 | 4/2012 | Silva | |
| 2002/0180130 | A1 | 12/2002 | Baur et al. | |
| 2005/0174893 | A1 | 8/2005 | Remont | |
| 2005/0219957 | A1 * | 10/2005 | Lambert | G04B 17/34 368/177 |
| 2011/0310710 | A1 | 12/2011 | Karapatis et al. | |
| 2014/0219067 | A1 | 8/2014 | Hessler | |
| 2015/0355600 | A1 | 12/2015 | Cusin et al. | |
| 2016/0147196 | A1 | 5/2016 | Villard et al. | |
| 2016/0368095 | A1 | 12/2016 | Cusin et al. | |

FOREIGN PATENT DOCUMENTS

| | | | |
|---|---|---|---|
| CH | 468662 | A | 3/1969 |
| CH | 561 921 | A | 5/1975 |
| CH | 705464 | A2 | 3/2013 |
| CH | 706 846 | A1 | 2/2014 |
| CH | 708 945 | A2 | 6/2015 |
| CN | 1206861 | A | 2/1999 |
| CN | 104698803 | A | 6/2015 |
| DE | 1905488 | U | 11/1964 |
| DE | 1 523 801 | A1 | 7/1969 |
| DE | 1 940 250 | A1 | 2/1971 |
| EP | 0 886 195 | A1 | 12/1998 |
| EP | 0886195 | A1 | 12/1998 |
| EP | 1 258 786 | A1 | 11/2002 |
| EP | 2881804 | A2 | 6/2015 |
| FR | 1446082 | A | 7/1966 |
| FR | 2017027 | A1 | 5/1970 |
| FR | 2057048 | A7 | 5/1971 |
| FR | 2057048 | A7 | 7/1971 |
| FR | 2312810 | A1 | 12/1976 |
| FR | 2315714 | A1 | 1/1977 |
| FR | 2995098 | A3 | 3/2014 |
| GB | 1 272 323 | A | 4/1972 |
| JP | S47-21663 | U | 11/1972 |
| JP | S51-145358 | A | 12/1976 |
| JP | H11-71625 | A | 3/1999 |
| JP | 2016-99345 | A | 5/2016 |
| WO | 2015/189278 | A2 | 12/2015 |

OTHER PUBLICATIONS

Translation of Office Action dated Jun. 4, 2020, issued in counterpart CN Application No. 201710403332.8. (10 pages).

Office Action dated Apr. 6, 2020, issued in counterpart EP Application No. 16172454.7. (5 pages).

European Search Report and Written Opinion dated Dec. 7, 2016 issued in European application No. EP16172454, counterpart of parent's co-pending U.S. Appl. No. 15/609,753, now U.S. Pat. No. 10,338,529; w/ English partial translation and partial machine translation (12 pages) (U.S. Pat. No. 3,016,688A cited in the ESR of the co-pending application is not listed on this IDS form since it is already listed on another IDS form filed concurrently).

Notice of Allowance dated Mar. 6, 2019 in parent's co-pending U.S. Appl. No. 15/609,753, now U.S. Pat. No. 10,338,529; with PTO892; without returned SB08 (9 pages).

"Titanium and Titanium Alloys", Bibus Metals, URL:https:jjwww.bibusmetals.ch/fileadmin/materials/PDF/Technical Information/Titanprospekt.pdf, 2007, 6 pages; in English; cited in the European Search Report.

European Search Report and Written Opinion dated Dec. 2, 2016 issued in counterpart application No. EP16172445; w/ English partial translation and partial machine translation (17 pages).

English Translation of Office Action dated Mar. 9, 2021, issued in counterpart JP Application No. 2017-103455. (5 pages).

English Translation of Office Action dated Mar. 9, 2021, issued in counterpart JP Application No. 2017-103454. (3 pages).

Office Action dated Apr. 26, 2021, issued in counterpart EP Application No. 16172445.5. (7 pages).

Takashi Saito, et al., Multifunctional Alloys Obtained via a Dislocation-Free Plastic Deformation Mechanism, Science, vol. 300, pp. 464-467 (Apr. 2003) (cited in Annex to Office Action dated Apr. 26, 2021 issued in counterpart EP Application No. 16172445.5).

* cited by examiner

FASTENING PART FOR A HAIRSPRING

This application is a divisional of U.S. application Ser. No. 15/609,749 filed May 31, 2017, which is hereby incorporated by reference herein in its entirety, and each of which claims priority of European patent application No. EP16172445.5 filed Jun. 1, 2016, which is hereby incorporated by reference herein in its entirety.

The invention relates to a fastening part for an end of a hairspring, notably a stud or a collet. The invention also relates to an assembly including a hairspring and such a stud and/or such a collet. The invention also relates to an oscillator or a clockwork movement or a timepiece including such an assembly. Finally, the invention concerns a manufacturing method for such an assembly.

Clockwork mechanical oscillator mechanisms incorporating a hairspring usually have a collet for fastening the inner end of the hairspring and/or a stud for fastening the outer end of the hairspring. Where a hairspring is made of a paramagnetic alloy including at least one of the elements Nb, V, Ta, Ti, Zr or Hf, the fastening part of the hairspring, i.e. the collet or the stud, may be attached to the hairspring by welding, in particular by laser welding. In general, this fastening part is made of steel, in particular stainless steel. Such an assembly solution is satisfactory for welding a hairspring made of a Nb—Zr—O paramagnetic alloy, such as the one protected by patent EP0886195B1.

Application CH706846 relates more specifically to a split collet made of a titanium-based material. The low density of the titanium is used to provide a collet with low mass density such as to improve the isochronism of the oscillator incorporating said collet. Document CH706846 nonetheless discloses a collet with an entirely conventional structure with first and second flat sides. The collet has a lateral aperture designed to receive the blade of the inner end of a hairspring. This latter may be fastened in a conventional manner, either by pinning or by welding, in particular by laser welding. However, no geometric adaptation of the receiving surface is proposed to enable or optimize welding of the hairspring into the groove of the collet. Furthermore, no details are provided regarding the nature of the material used to make the hairspring designed to be attached to said collet.

It is known to fasten a hairspring to a collet or to a stud by laser welding. Patent application CH561921 for example discloses a laser welding method for a collet including a pre-fastening stage of the hairspring to position the hairspring accurately in relation to the collet.

Application FR2017027 specifically concerns the laser welding of the inner end of a hairspring against a semi-circular collet portion centered on the axis of rotation of the hairspring. No details are provided as to the nature of the materials used to make the device. The blade portion of the inner end of the hairspring in this case lies continuously against the collet portion. A single spot weld is provided along the contact line between the spiral spring and the collet. To obviate the risk of the weld tearing, it is recommended that the intensity of the laser be adjusted to ensure that the spot weld does not penetrate more than half of the height of the blade and that the spot weld is at least as long as the height of said blade. Nonetheless, such a design does not prevent the appearance of fragile intermetallic compounds that contribute to weakening the weld. Furthermore, such a design also risks overheating the blade of the spiral spring and therefore potentially changing the mechanical properties of same, as well as having undesirable esthetic effects.

Patent CH468662 discloses a specific collet geometry that has the peculiarity of including an annular slot intended to support and guide the blade of the inner end of the hairspring. Such a design does not enable thermal conduction between two weld zones to be interrupted if the leaf spring is welded to the collet, in particular by laser welding.

U.S. Pat. No. 3,016,688 discloses an elastic stud that has a flat surface onto which a blade portion of the outer end of a hairspring is welded. The description specifies that the stud can be welded at multiple points, notably at more than two points. No mention is made of the materials used to make the device, although the description does specify that such a solution improves the hold of the spiral spring against the stud. Nonetheless, such a design does not prevent the appearance of fragile intermetallic compounds that could contribute to the weakening of either of the spot welds, and that could weaken the fitting of the hairspring, thereby altering the chronometry, and in particular the isochronism curve, of the oscillator incorporating such a device. Furthermore, the geometry of such a stud does not enable the thermal conduction between two spot welds to be interrupted.

The use of hairsprings including at least one of the elements Nb, V, Ta, Ti, Zr or Hf is also known in the prior art. Patent EP0886195B1 for example discloses a spiral spring made of a paramagnetic alloy Nb—Zr having between 5% and 25% by mass of Zr, as well as an interstitial doping agent made at least partially of oxygen.

Patent EP1258786B1 also discloses a spiral spring made of paramagnetic alloy Nb—Hf containing between 2% and 30% by mass of Hf.

Application WO2015189278 discloses a balance spring containing a hairspring manufactured using a titanium alloy containing notably a titanium base comprising 10 at. % to 40 at. % of one of the elements Nb, Ta, or V; 0 at. % to 6 at,% Zr; and 0 at. % to 5 at. % Hf. The document specifies that such a hairspring may be provided with a collet and a stud so as to be assembled inside an oscillator, without any further details.

The purpose of the invention is to provide a fastening part for an end of a hairspring that addresses the drawbacks mentioned above and improves the fastening parts known in the prior art. In particular, the invention proposes a fastening part that improves the fastening of a hairspring, notably that improves the adherence strength of a hairspring.

According to a first aspect of the invention, a fastening part is defined by the following proposals:

a. Fastening part, in particular a stud or collet, for an end of a hairspring made of paramagnetic alloy including at least one of the following elements: Nb, V, Ta, Ti, Zr and Hf, the fastening part having a first portion that is designed to come into contact with the hairspring and that is made of titanium or titanium alloy or of tantalum or tantalum alloy, notably grade 2 titanium or grade 5 titanium.

b. Fastening part according to proposal (a), wherein the first portion has two bearing surfaces separated by a slot, each bearing surface being designed to come into contact with the hairspring and the slot extending notably in the direction of the height of the hairspring, preferably over a height greater than the height of the hairspring.

c. Fastening part according to proposal (b), wherein each surface has, at at least one of the ends of same in the direction of the height of the hairspring, a positioning shape extending perpendicular or substantially perpendicular to the surface.

d. Fastening part according to proposal (b), wherein each surface has, at two of the ends of same in the direction of the height of the hairspring, respectively a first positioning shape and a second positioning shape, the shapes extending perpendicular or substantially perpendicular to said surface.

e. Fastening part according to one of proposals (a) to (d), wherein the fastening part includes a second portion designed to come into contact with a stud support or with a balance arbor.

f. Fastening part according to one of proposals (a) to (e), wherein the surfaces are arranged substantially perpendicular to a plane of the hairspring and together form an angle, notably an angle of between 150° and 179° considered from an axis of the hairspring.

g. Fastening part according to one of proposals (a) to (e), wherein the surfaces are arranged substantially perpendicular to a plane of the spiral spring and/or are curved to form portions of a single cylinder of revolution or are made tangential to a single cylinder of revolution.

h. Fastening part according to proposal (g), wherein the fastening part is a collet and wherein the cylinder of revolution is centered on an axis of the collet.

i. Fastening part according to one of proposals (a) to (h), wherein the fastening part is a collet and wherein the collet includes at least one stop, and notably two, three, four or five stops, distributed angularly, notably distributed angularly and regularly, about an outer periphery of the collet.

According to the first aspect of the invention, a manufacturing method is defined by the following proposals:

j. Manufacturing method for an assembly including a stud according to one of proposals (a) to (g) and a hairspring made of a paramagnetic alloy including at least one of the following elements: Nb, V, Ta, Ti, Zr and Hf, the method comprising the following steps:
Provision of the stud,
Provision of the hairspring,
Fastening of the stud to the hairspring.

k. Manufacturing method for an assembly including a collet according to one of proposals (a) to (i) and a hairspring made of a paramagnetic alloy including at least one of the following elements: Nb, V. Ta, Ti, Zr and Hf, the method comprising the following steps:
Provision of the collet,
Provision of the hairspring,
Fastening of the collet to the hairspring.

l. Manufacturing method for an assembly including a stud according to one of proposals (a) to (g), a collet according to one of proposals (a) to (i) and a hairspring made of a paramagnetic alloy including at least one of the following elements: Nb, V, Ta, Ti, Zr and Hf, the method comprising the following steps:
Provision of the stud,
Provision of the hairspring,
Provision of the collet,
Fastening of the stud to the hairspring and fastening of the collet to the hairspring.

m. Manufacturing method according to one of proposals (k) to (l), wherein the fastening step is performed by laser welding.

According to the first aspect of the invention, an assembly is defined by the following proposals:

n. Assembly comprising:
a hairspring, notably a hairspring made of a paramagnetic alloy, in particular a hairspring made of a paramagnetic alloy including at least one of the following elements: Nb, V, Ta, Ti, Zr and Hf, notably an alloy including the elements Nb and Zr with between 5% and 25% by mass of Zr and an interstitial doping agent including oxygen, and
a stud according to one of proposals (a) to (g), and/or
a collet according to one of proposals (a) to (i).

According to the first aspect of the invention, a clockwork oscillator or a clockwork movement or a timepiece is defined by the following proposal:

o. Clockwork oscillator or clockwork movement or timepiece including:
an assembly according to proposal (n), and/or
an assembly obtained by carrying out the method according to one of proposals (j) to (m), and/or
a stud according to one of proposals (a) to (g), and/or
a collet according to one of proposals (a) to (i).

According to a second aspect of the invention, a fastening stud is defined by the following proposals:

aa. Fastening stud for an end of a hairspring, the stud having a first portion designed to come into contact with the hairspring, the first portion being formed such as to have a first surface and at least one second bearing surface with the hairspring.

bb. Stud according to proposal (aa), wherein the first and second surfaces are uninterrupted, and in particular uninterrupted with no edges between the first and second surfaces.

cc. Stud according to proposal (aa), wherein the first and second surfaces are discontinuous.

dd. Stud according to proposal (cc), wherein the first and second bearing surfaces are separated by a slot, the slot extending notably in the direction of the height of the hairspring, preferably over a height greater than the height of the hairspring.

ee. Stud according to one of proposals (aa) to (dd), wherein each surface has, at one of the ends of same in the direction of the height of the hairspring, a positioning shape extending perpendicular or substantially perpendicular to the surface.

ff. Stud according to one of proposals (aa) to (dd), wherein each surface has, at two of the ends of same in the direction of the height of the hairspring, respectively a first positioning shape and a second positioning shape, the shapes extending perpendicular or substantially perpendicular to said surface.

gg. Stud according to one of proposals (aa) to (ff), wherein the stud has a second portion designed to come into contact with a stud support.

hh. Stud according to one of proposals (aa) to (gg), wherein the first and second surfaces are flat or cylindrical, in particular cylinders of revolution.

ii. Stud according to one of proposals (aa) to (hh), wherein the first and second surfaces are arranged substantially perpendicular to a plane of the hairspring and/or together form an angle, notably an angle of between 150° and 179° considered from an axis of the hairspring.

jj. Stud according to one of proposals (aa) to (ii), wherein the first and second surfaces are arranged substantially perpendicular to a plane of the spiral spring and/or are curved to form portions of a single cylinder of revolution or are made tangential to a single cylinder of revolution.

kk. Stud according to one of proposals (aa) to (jj), wherein at least one of the first and second surfaces forms a non-zero angle with a plane that is parallel and orthoradial to the axis of the hairspring.

ll. Stud according to one of proposals (aa) to (kk), wherein the first surface and the at least one second surface together form an angle, notably an angle of between 150° and 179° considered from an axis of the hairspring.

mm. Stud according to one of proposals (aa) to (ll), wherein the first surface and the at least one second surface are designed to receive two zones of a single spiral spring face, the two zones being separated from one another in the direction in which the spiral spring extends.

According to the second aspect of the invention, a method is defined by the following proposals:

nn. Manufacturing method for an assembly including a stud according to one of proposals (aa) to (mm) and a hairspring, the method comprising the following steps:
Provision of the stud,
Provision of the hairspring,
Fastening of the stud to the hairspring at the level of the first and second surfaces.

oo. Manufacturing method according to proposal (nn), wherein the fastening step is performed by laser welding.

According to the second aspect of the invention, an assembly is defined by the following proposal:

pp. Assembly comprising:
a hairspring, and
a stud according to one of proposals (aa) to (mm).

According to the second aspect of the invention, a clockwork oscillator or a clockwork movement or a timepiece is defined by the following proposal:

qq. Clockwork oscillator or clockwork movement or timepiece including:
an assembly according to proposal (pp), and/or
an assembly obtained by carrying out the method according to one of proposals (nn) and (oo), and/or
a stud according to one of proposals (aa) to (mm).

According to a third aspect of the invention, a fastening part of an end of a hairspring, notably a stud or a collet, has a first portion designed to come into contact with the hairspring. The first portion has two bearing surfaces separated by a slot, each bearing surface being designed to come into contact with the hairspring. The slot extends notably in the direction of the height of the hairspring, preferably over a height greater than the height of the hairspring, According to a fourth aspect of the invention, an assembly according to the invention is defined by claim 1.

Different embodiments of the assembly are defined by dependent claims 2 to 9.

According to the fourth aspect of the invention, the methods according to the invention are defined by claims 10 to 13.

According to the fourth aspect of the invention, an oscillator according to the invention or a clockwork movement according to the invention or a timepiece according to the invention is defined by claim 14.

Except where technically or logically impossible, all of the features and/or specific details of the first, second, third and fourth aspects of the invention can be combined.

The attached figures show, by way of example, one embodiment of a timepiece incorporating an embodiment of a stud according to the invention and an embodiment of a collet according to the invention.

Figure 12:
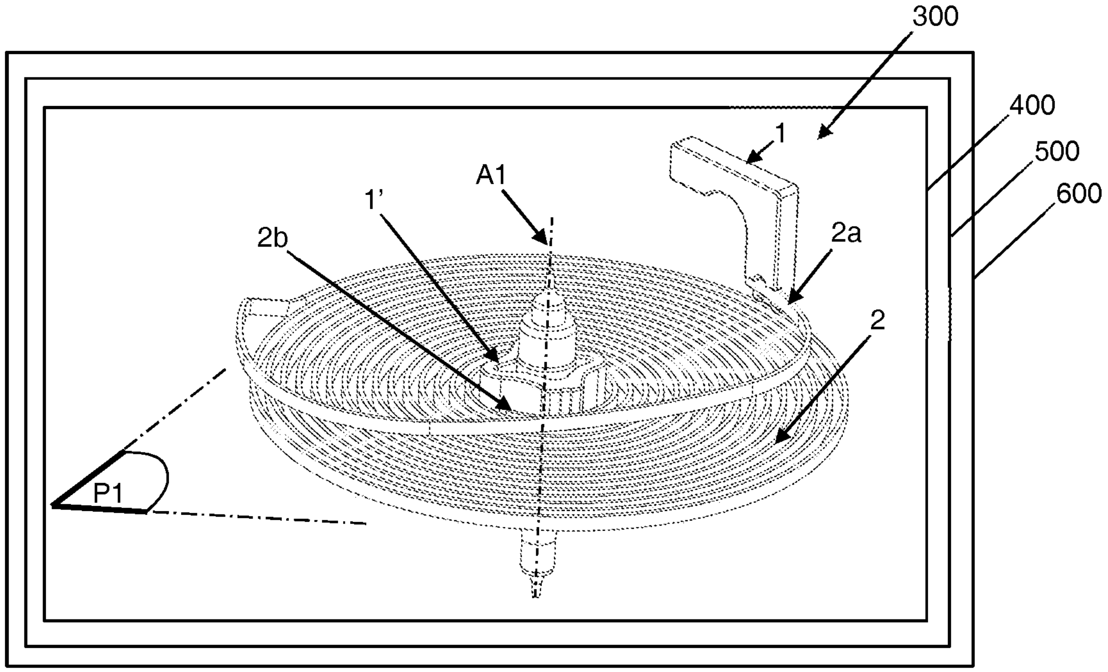
FIG. 12 is a diagram showing an embodiment of a timepiece according to the invention including a stud according to the invention and a collet according to the invention.

One embodiment of a timepiece 600 is described below with reference to FIG. 12. The timepiece is for example a watch, in particular a wristwatch. The timepiece includes a clockwork movement 500, in particular a mechanical movement, which in turn includes an oscillator 400, such as a balance spring oscillator having a balance pivoted on an axis A1 and a hairspring arranged mainly in a plane P1 perpendicular to the axis A1. The axis A1 is also the axis of the hairspring.

Figure 3:
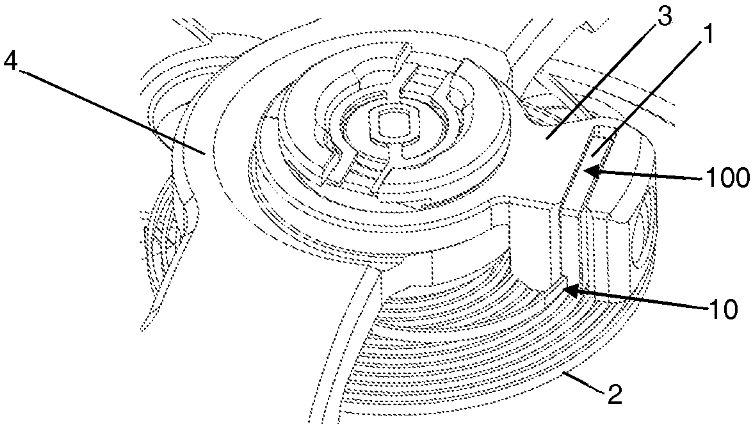
FIG. 3 is a partial perspective view of an oscillator incorporating the embodiment of a stud according to the invention.

The oscillator 400 has a spiral spring assembly 300 including a hairspring 2, a first part 1' for fastening the inner end **2*b* of the hairspring to a balance arbor, i.e. a collet 1', and a second part 1 for fastening the outer end 2*a* of the hairspring to a frame of the movement, notably a balance bridge 4, possibly via a stud support 3, as shown in FIG. 3**. The second fastening part is a stud.

Advantageously, the hairspring is made of a paramagnetic alloy including at least one of the following elements: Nb, V, Ta, Ti, Zr and Hf. In particular, the hairspring includes at least 2%, or at least 5%, by mass of one of the following elements: Nb, V, Ta, Ti, Zr and Hf. Preferably, the hairspring is made of an alloy including the elements Nb and Zr with between 5% and 25% by mass of Zr and an interstitial doping agent including oxygen. Preferably, the hairspring is made of an alloy including 85% by mass of Nb, 14.95% by mass of Zr and 0.05% by mass of oxygen. The alloy may also include other impurities, for example within the following limits: Hf<7000 ppm, Ta<1000 ppm, W<300 ppm, Mo<100 ppm, others<60 ppm.

Preferably, the stud 1 includes a portion 10 designed to come into contact with the hairspring 2. Advantageously, the stud is made of:
titanium, or
titanium alloy, notably grade 2 titanium or grade 5 titanium, or
tantalum, or
tantalum alloy.

Equally and preferably, the collet 1' includes a portion 10' designed to come into contact with the hairspring 2. Advantageously, the collet is made of:
titanium, or
titanium alloy, notably grade 2 titanium or grade 5 titanium, or
tantalum, or
tantalum alloy.

"Titanium" preferably means any material with a mass percent of titanium greater than 99%, or greater than 99.5%.

"Titanium alloy" preferably means any other material whose main or dominant element by mass is titanium, such as grade 5 titanium (Ti6Al4V).

"Tantalum" preferably means any material with a mass percent of tantalum greater than 99%, or greater than 99.5%.

"Tantalum alloy" preferably means any other material whose main or dominant element by mass is tantalum, such as tantalum TaW containing between 2.5% and 10% of W by mass or tantalum TaNb containing approximately 40% of Nb by mass, Making the collet and/or the stud from titanium or titanium alloy is particularly suited to welding a hairspring made of a niobium-based alloy that has between 5% and 25% by mass of Zr, in particular an alloy including the elements Nb and Zr with between 5% and 25% by mass of Zr and an interstitial doping agent including oxygen. Indeed, Nb and Zr are entirely soluble in Ti.

Making the collet and/or the stud from tantalum or tantalum alloy is particularly suited to welding a hairspring made of a titanium base that has between 17% and 62% by mass of one of the elements Nb or Ta, for example at least 17% by mass of Nb and for example a maximum of 62% by mass of Ta. Making the collet and/or stud from tantalum or tantalum alloy is advantageous for welding an Nb—Hf hairspring comprising between 2% and 30% by mass of Hf.

One embodiment of a stud according to the invention is described below in detail and with reference to FIGS. 1 to 6.

The stud is for example made from a single piece, as in the embodiment illustrated. The stud notably has an overall square shape formed by two branches of substantially the same size. The two branches may be connected to one another by a radius fillet.

Figure 2:
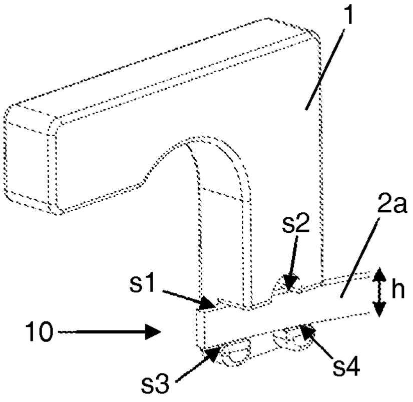
FIG. 2 is a perspective view of the embodiment of a stud according to the invention.

The stud 1 includes a first portion 10 designed to be welded to the hairspring 2, in particular by laser welding, at the outer end 2*a* of the hairspring, as shown in FIG. 2. The stud also has a second portion 100 designed to be fastened, notably inserted, conventionally into a groove of the stud support 3, which is mounted on the balance bridge 4, as shown in FIG. 3. The first and second portions may be made of different materials and assembled on top of one another.

The first portion 10 has a first bearing surface 10*b* and a second bearing surface 10*c* that are separated by a slot 10*a*. Each bearing surface is designed to come into contact with the hairspring. In the embodiment shown, the slot extends in the direction of the height h of the hairspring, preferably over a height H10 greater than the height of the hairspring. The slot 10*a* enables the first and second bearing surfaces 10*b*, 10*c* to be separated or distinguished from one another. The slot 10*a* is advantageously oriented substantially in the direction of the height H10 of the portion 10 of the stud 1. Such an arrangement enables heat conduction to be completely interrupted when welding the blade of the spiral spring to each of the first and second bearing surfaces 10*b*, 10*c* and to prevent the occurrence of interference between two zones of the hairspring affected thermally during welding. This arrangement enables the necessary energy to be applied to the weld, optimizing preservation of the mechanical properties of the alloy of the hairspring.

The slot can be formed through part of the thickness of the stud, i.e. without passing through the stud. Alternatively, the slot can pass through the entire thickness of the stud.

As an alternative to the foregoing, the slot may be oriented perpendicular to the height h of the hairspring. The slot may also be oriented in another direction.

The first surface and the second surface are designed to receive two zones of a single spiral spring face. Preferably, the two zones are separated from one another in the direction of the spiral spring, i.e. in the direction in which the spiral spring mainly extends at the zones. There is therefore a space between the zones (space measured in the direction in which the spiral spring mainly extends at the zones). It is therefore not possible to move from one point of a zone to a point of the other zone without travelling a distance in the direction in which the spiral spring mainly extends at the zones.

The first bearing surface 10*b* has a first relief 103*b* or 104*b* at one of the ends 101*b* or 102*b* of same. This first relief provides a positioning stop for the hairspring, notably an axial positioning stop for the hairspring. Indeed, the blade of the hairspring, in bearing contact with the first surface, can be moved to come into contact against the first relief such as to accurately position the hairspring in relation to the stud in the direction of the height H10 of the stud. The first relief extends for example perpendicular or substantially perpendicular to the first surface 10*b*, such as to form a stop. Advantageously, the first bearing surface 10*b* has a second relief 103*b* or 104*b* at the other of the ends 101*b* or 102*b* of same. This second relief provides a positioning stop for the hairspring. The second relief extends for example perpendicular or substantially perpendicular to the first surface 10*b*, such as to form a stop.

Similarly, the second bearing surface 10*c* may have a third relief 103*c* or 104*c* at one of the ends 101*c* or 102*c* of same. This third relief provides a positioning stop for the hairspring. Indeed, the blade of the hairspring, in contact against the second surface, can be moved to come into contact against the third relief such as to accurately position the hairspring in relation to the stud in the direction of the height H10 of the stud. The third relief extends for example perpendicular or substantially perpendicular to the second surface 10*c*, such as to form a stop. Advantageously, the second bearing surface 10*c* has a fourth relief 103*c* or 104*c* at the other of the ends 101*c* or 102*c* of same. This fourth relief provides a positioning stop for the hairspring. The fourth relief extends for example perpendicular or substantially perpendicular to the second surface 10*c*, such as to form a stop.

Figure 1:
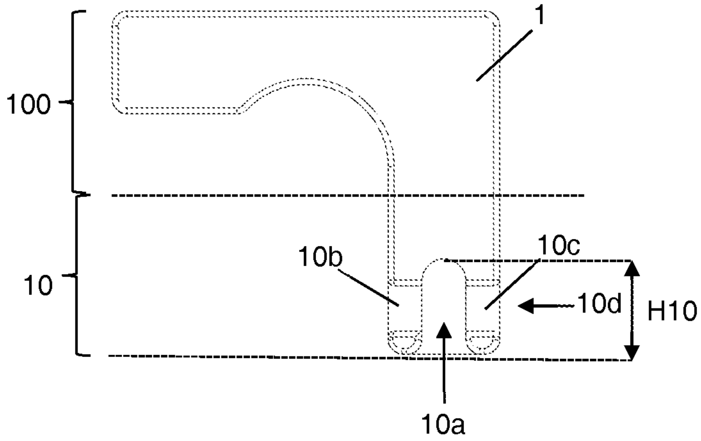
FIG. 1 is a front view of an embodiment of a stud according to the invention.

The positioning reliefs described above enable the blade of the hairspring to be positioned accurately in relation to the stud, thereby enabling the hairspring to be accurately fitted after the hairspring has been welded onto the stud. Welding may comprise two spot welds s1, s2 made respectively at each of the bearing surfaces 10*b*, 10*c* or on the edge of each of the bearing surfaces 10*b*, 10*c*. Preferably, the third and fourth spot welds s3, s4 are made respectively at each of the bearing surfaces 10*b*, 10*c* or on the edge of each of the bearing surfaces 10*b*, 10*c*, in addition to the spot welds s1, s2, as shown in FIG. 2. To ensure this precise positioning, where one or two of the bearing surfaces each have two positioning reliefs, said reliefs are spaced apart by a distance greater than the height h of the spring blade. Advantageously, this height play is less than 0.04 mm, or less than 0.03 mm. The positioning reliefs described above form a second slot 10*d* oriented substantially perpendicular to the first slot 10*a* in order to support and/or guide the blade of the hairspring, as shown in FIG. 1.

Figure 5:
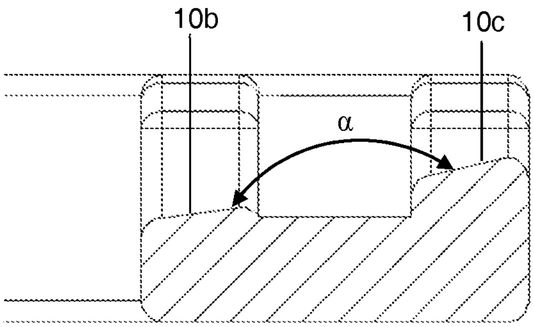
Figure 6:
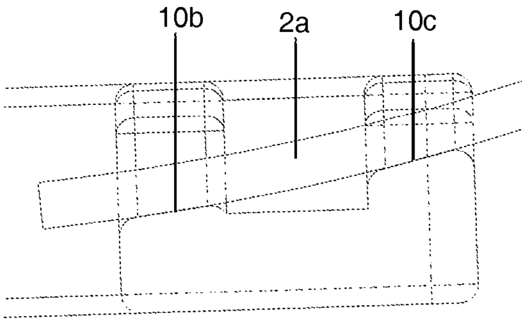
Figure 7:
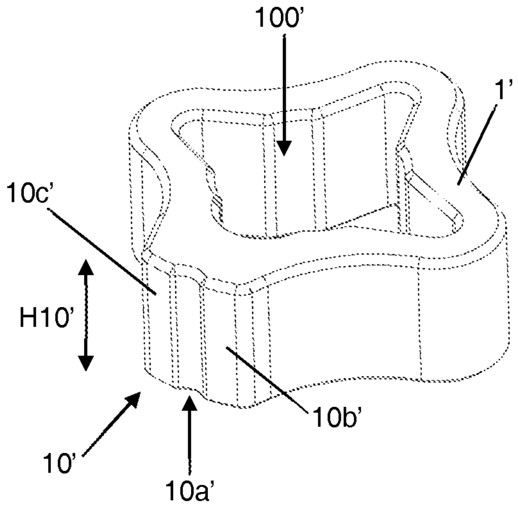
FIGS. 7 to 11 show an embodiment of a collet according to the invention.

Advantageously, the first and second bearing surfaces 10*b* and 10*c* are designed to perfectly fit the curve of the end blade of the hairspring. To do so, the first and second surfaces 10*b*, 10*c* are inclined in relation to the surface defined by the bottom of the slot 10*a* or to the face of the stud that is visible in the view in FIG. 1. Preferably, the first and second surfaces 10*b*, 10*c* are inclined at two different angles, which may for example be between 5° and 15°. Consequently and as shown in FIGS. 5 and 6, the first and second surfaces 10*b*, 10*c* may together form an angle α (i.e. a non-zero angle), notably an angle α of between 150° and 179° considered from the axis A1 of the balance or of the hairspring. In other words, the axis A1 is within the obtuse dihedral formed by two half-planes passing through the first and second surfaces respectively. The first and second surfaces may also be arranged perpendicular or substantially perpendicular to the plane P1 of the spiral spring. The first and second surfaces may be flat faces. The faces may be tangential to a single surface, notably a single cylinder of revolution or a cylindrical surface of revolution or a more complex surface formed by a portion of the end curve of the hairspring. At least one of the first and second surfaces 10*b*, 10*c* can form a non-zero angle with a plane that is parallel and orthoradial to the axis A1.

Alternatively, the first and second surfaces may be curved surfaces designed to best fit the blade of the hairspring seated therein. For example, the first and second surfaces may each be a portion of a single cylinder of revolution or a cylindrical surface of revolution or a more complex surface formed by a portion of the end curve of the hairspring.

In the embodiment of the stud shown, the first and second surfaces are discontinuous. However, alternatively, the first and second surfaces may be uninterrupted, i.e. forming a single surface. This single surface may be a “continuous tangent”, i.e. have no edges.

Ideally, these first and second surfaces are identical to the surface, which is not necessarily cylindrical, of the outer end 2*a* of the hairspring.

Such a stud design advantageously provides at least two contact points between the stud and the end blade of the hairspring. The assembly precision, notably the welding precision, of a hairspring on such a stud is thus optimized, and is no longer only guaranteed by the assembly means. In the techniques known in the prior art, the assembly means are formed such as to minimize, before fastening of the blade of the hairspring to the stud, the movements of the blade of the hairspring about the theoretical contact point of same defined exclusively by the curve of the spring and a single and unique receiving plane of the stud. This degree of freedom enabling the blade to oscillate through an angular range of approximately 4°, or 8° about the theoretical contact point of same enables torque to exist in the blade at the outer fitting of the hairspring, once the blade has been fastened to the stud. This phenomenon may cause the non-concentric arrangement of the hairspring, thereby resulting in chronometry problems, in particular in the isochronism curve and “flat-hanging difference”.

Figure 14:
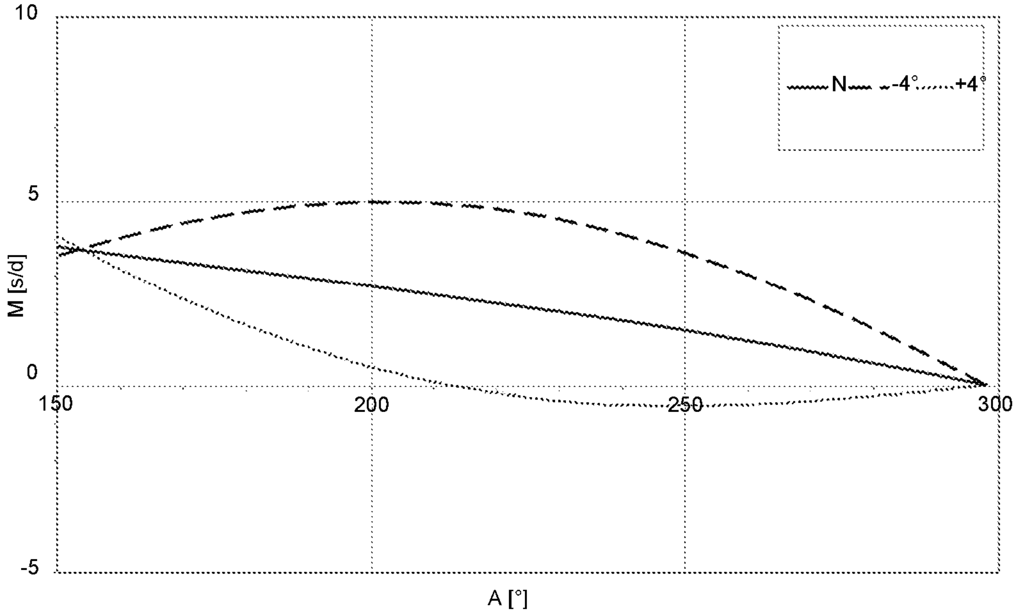
FIG. 14 is a graph showing the mean rate (M) of a timepiece, averaged for the different position of the timepiece, as a function of the amplitude (A) of the balance spring in free isochronism.

FIG. 14 is a graph showing the mean rate M in seconds per day of a timepiece, averaged for the different position of the timepiece, as a function of the amplitude A in degrees of the balance spring in free isochronism. The dashed lines, showing the isochronism curves for a balance spring assembly representative of the prior art, in which the end of the end curve of the hairspring has been moved through an angle of ±4° about the theoretical contact point of same with the stud, define an envelope in which the mean rate of the timepiece varies as a function of the nominal position of the blade of the hairspring in relation to the stud.

The unbroken line N shows a function with an optimized isochronism curve representing operation of a balance spring assembly provided with a stud according to the invention, with a hairspring in which the end of the end curve is accurately positioned by the first and second bearing surfaces of the stud. Notably, such an arrangement in practice reduces the isochronism curve and “flat-hanging difference” in the timepiece containing the balance spring.

One embodiment of a collet according to the invention is described below in detail and with reference to FIGS. 7 to 11.

Figure 8:
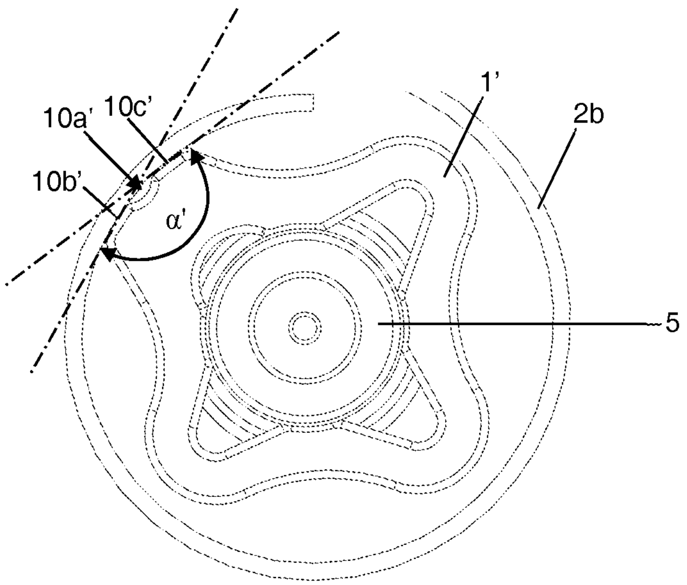

The collet includes a first portion 10' designed to be welded to a hairspring 2, in particular by laser welding, at the inner end 2*b* of the hairspring, as shown in FIG. 8. The collet also has a second portion 100', in the form of a central opening 100', that is for example designed to be pressed against the balance arbor 5, as shown in FIGS. 8 to 11. The first and second portions may be made from a single part. Alternatively, the first and second portions may be made of different materials and assembled on top of one another.

As with the stud 1, the portion 10' has a first slot 10*a*' defining two bearing surfaces 10*b*', 10*c*' of a blade portion of the inner end of the hairspring 2. Thus, the first portion 10' has a first bearing surface 10*b*' and a second bearing surface 10*c*' that are separated by a slot 10*a*'. Each bearing surface is designed to come into contact with the hairspring. In the embodiment shown, the slot extends in the direction of the height h of the hairspring, preferably over a height H10' greater than the height of the hairspring. The slot 10*a*' enables the first and second bearing surfaces 10*b*', 10*c*' to be separated or distinguished from one another. The slot 10*a*' is advantageously oriented substantially in the direction of the height H10' of the portion 10 of the stud 1. Such an arrangement enables heat conduction to be completely interrupted when welding the blade of the spiral spring to each of the first and second bearing surfaces 10*b*', 10*c*' and to prevent the occurrence of interference between two zones of the hairspring affected thermally during welding. This arrangement enables the necessary energy to be applied to the weld, optimizing preservation of the mechanical properties of the alloy of the hairspring. The slot can also be used as a visual marker for accurately positioning the spot welds around the periphery of the collet.

As an alternative to the foregoing, the slot may be oriented perpendicular to the height h of the hairspring. Alternatively, the slot may be oriented in another direction.

Figure 4:
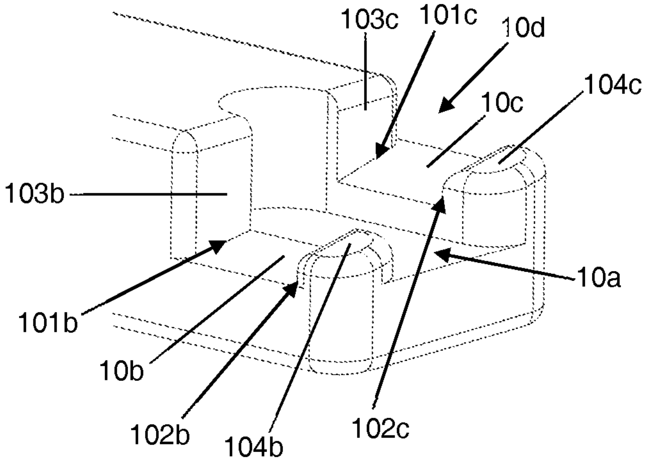
FIGS. 4 to 6 are detail views of the embodiment of a stud according to the invention.

In an embodiment not shown, the first bearing surface may have a first relief at one of the ends of same (see, e.g., similar first relief 103*b*, 104*b* shown in FIG. 4). This first relief provides a positioning stop for the hairspring. Indeed, the blade of the hairspring, in contact against the first surface, can be moved to come into contact against the first relief such as to accurately position the hairspring in relation to the collet in the direction of the height of the collet. The first relief extends for example perpendicular or substantially perpendicular to the first surface 10*b*', such as to form a stop. Advantageously, the first bearing surface 10*b*' may have a second relief at the other of the ends of same (see, e.g., similar second relief 103*b*, 104*b* shown in FIG. 4). This second relief provides a positioning stop for the hairspring. The second relief extends for example perpendicular or substantially perpendicular to the first surface 10*b*', such as to form a stop.

Similarly, the second bearing surface 10*c*' may have a third relief at one of the ends of same (see, e.g., similar third relief 103*c*, 104*c* shown in FIG. 4). This third relief provides a positioning stop for the hairspring. Indeed, the blade of the hairspring, in contact against the second surface, can be moved to come into contact against the third relief such as to accurately position the hairspring in relation to the collet in the direction of the height of the collet. The third relief extends for example perpendicular or substantially perpendicular to the second surface 10c', such as to form a stop. Advantageously, the second bearing surface 10c' may have a fourth relief at the other of the ends of same see, e.g., similar fourth relief 103c, 104c shown in FIG. 4). This fourth relief provides a positioning stop for the hairspring. The fourth relief extends for example perpendicular or substantially perpendicular to the second surface 10c', such as to form a stop.

Figure 9:
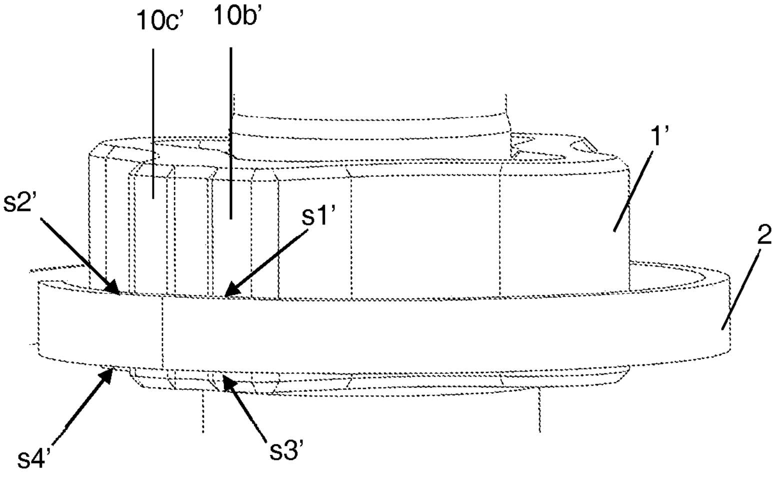
Figure 10:
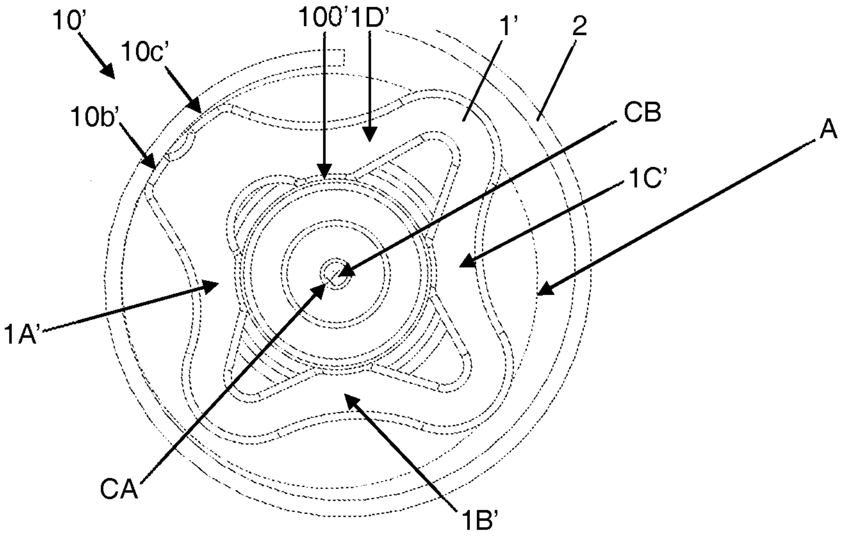

The positioning reliefs described above enable the blade of the hairspring to be positioned accurately in relation to the stud, thereby enabling the hairspring to be accurately fitted after the hairspring has been welded onto the collet. Welding may comprise two spot welds s1', s2' made respectively at each of the bearing surfaces 10b', 10c' or on the edge of each of the bearing surfaces 10b', 10c'. Preferably, the third and fourth spot welds s3', s4' are made respectively at each of the bearing surfaces 10b', 10c' or on the edge of each of the bearing surfaces 10b', 10c', in addition to the spot welds s1', s2', as shown in FIG. 9, To ensure this precise positioning, where one or two of the bearing surfaces each have two positioning reliefs, said reliefs are spaced apart by a distance greater than the height h of the spring blade. Advantageously, this height play is less than 0.04 mm, or less than 0.03 mm. The positioning reliefs described above can then form a second slot oriented substantially perpendicular to the first slot in order to support and/or guide the blade of the hairspring.

Advantageously, the first and second bearing surfaces 10b' and 10c' are designed to perfectly fit the curve of the blade of the hairspring. To do so, the first and second surfaces 10b', 10c' may together form an angle α', notably an angle α' of between 150° and 179° considered from the axis A1 of the balance or of the hairspring. In other words, the axis A1 is within the obtuse dihedral formed by two half-planes passing through the first and second surfaces respectively. The first and second surfaces may also be arranged perpendicular or substantially perpendicular to the plane P1 of the spiral spring. The first and second surfaces may be flat faces. The flat faces may be tangential to a single surface, notably a single cylinder of revolution. The precise positioning of the hairspring in relation to the collet also helps to achieve chronometric improvements of the same type as those obtained by the precise positioning of the hairspring in relation to the stud.

Advantageously, the surfaces 10b', 10c' are portions of a single cylinder of revolution in which the directrix is the circle A of center CA, which may or may not be centered on the axis A1 of the balance. In the embodiment shown in FIG. 10, the center CA is not on the axis A1, such as to minimize or eliminate the movement of the surfaces 10b', 10c' onto which the hairspring is welded when pressing the collet 1' onto the arbor 5.

Figure 11:
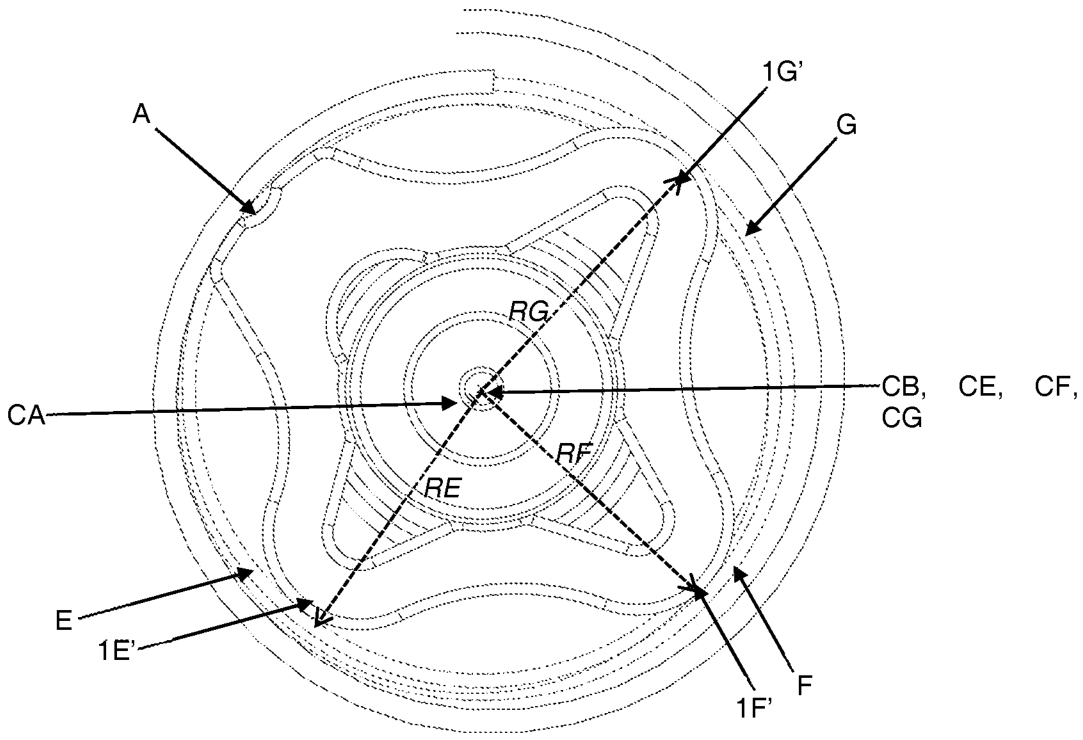

The collet 1' may include arms 1A', 1B', 1C', 1D', which may be deformable or otherwise and have variable sections or otherwise, such as to optimize the force required to press the collet onto the balance arbor and/or the holding torque of the collet on the balance arbor. Preferably, the contact between the collet and the arbor is cylinder-cylinder. The central opening 100' may be a circular borehole 100' designed to fit the cylindrical periphery of the balance arbor 5, such as to minimize the stress inside the collet when pressing the collet onto the balance arbor. Preferably, the collet has at least one peripheral portion or stop 1E', 1F', 1G' against which the inner turn of the hairspring can bear in the event of impact, before the elastic limit of the material used to make the hairspring is exceeded. These stops are distributed angularly, regularly or otherwise, around the outer periphery of the collet, as shown in FIG. 11.

Preferably, these stops are semicircle portions tangential respectively to the circles E, F, G with centers CE, CF, CG. In the embodiment shown, the circles E, F, G have different diameters to best fit the shape of the inner turn of the hairspring. The centers CE, CF, CG are in this case the same and coincide with the axis A1 or the center CB of the balance arbor 5, and are different from the center CA. The stops 1E', 1F', 1G' are located at respective distances RE, RF, RG from the axis A1 that increase in the direction of the spiral spring moving outwards from the point where the hairspring is joined to the collet.

An embodiment of the manufacturing method for an assembly 300 including:

a hairspring, and
a stud 1, and/or
a collet 1', is described below.

The method includes the following steps:

Provision of the hairspring as described above,
Provision of the stud as described above and/or of the collet as described above,
Fastening of the stud to the hairspring and/or fastening of the collet to the hairspring.

Advantageously, the fastening step or steps include the following sub-steps:

Positioning of the stud in relation to the hairspring and/or positioning of the collet in relation to the hairspring,
Welding, notably laser welding, of the stud to the hairspring and/or welding, notably laser welding, of the collet to the hairspring, Advantageously, the welding sub-step includes making at least one spot weld, in particular two spot welds, on each of the first and second surfaces of the stud designed to receive the hairspring and/or making at least one spot weld, in particular two spot welds, on each of the first and second surfaces of the collet designed to receive the hairspring.

Figure 13:
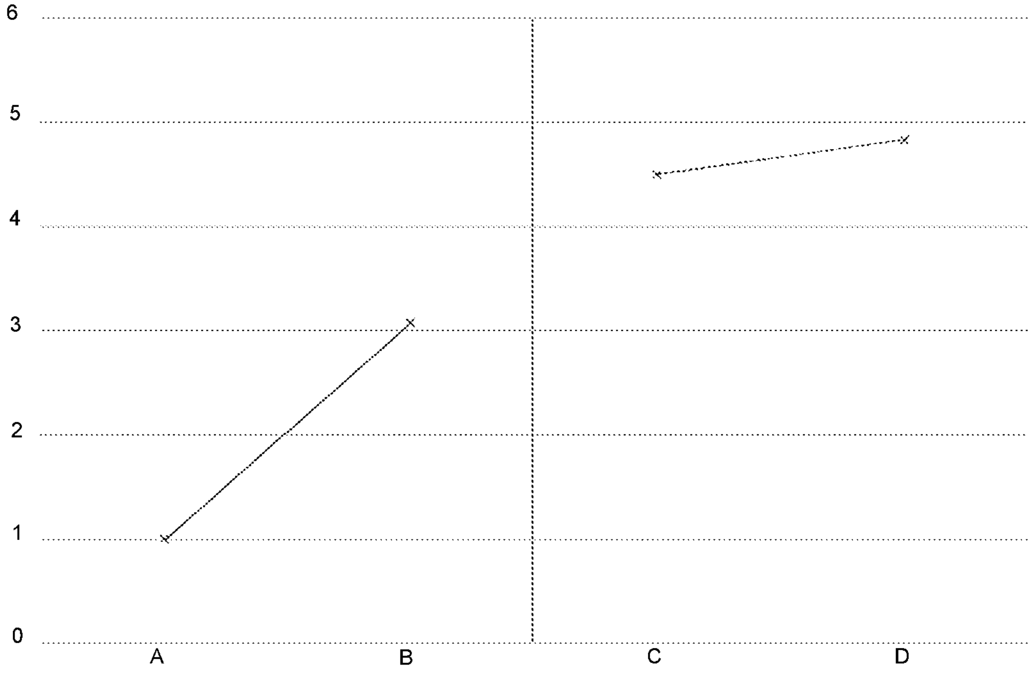
FIG. 13 is a graph showing the improvements in adherence strength of the hairspring on a stud according to the invention.

FIG. 13 is a comparative graph highlighting the gains of an assembly carried out in accordance with the manufacturing method described above. The graph shows different situations on the X-axis and the intensity of the pull forces on the Y-axis. Considering a reference force FA required to pull an Nb—Zr hairspring comprising approximately 15% by mass of Zr from a stud made of steel, the studies carried out by the applicant demonstrate that the force FB required to pull a given Nb—Zr hairspring from a given stud made of grade 5 titanium is around 3 times the reference force FA, with the forces FA and FB applied directly to the blade of the spiral spring near to the stud and arranged in the plane of the spiral spring and oriented substantially towards the center of the spiral spring.

Considering a reference force FC required to pull an Nb—Zr hairspring comprising approximately 15% by mass of Zr from a collet made of steel, the studies carried out by the applicant demonstrate that the force FD required to pull a given Nb—Zr hairspring from a given collet made of grade 5 titanium is around 1.1 times the reference force FC, with the forces FC and FD applied directly to the end portion of the blade of the spiral spring at the collet and arranged in the plane of the spiral spring in a direction substantially tangential to the semicircle portion of the collet receiving the hairspring.

The invention makes it possible to optimize the strength of the weld of a hairspring made of a paramagnetic alloy, notably in the event of impact, by choosing fastening parts in which the portion designed to come in contact with the hairspring is made of titanium or titanium alloy or tantalum or tantalum alloy. Such a pairing of materials helps to achieve a quality weld due to the total solubility of the solid phases, thereby preventing the appearance of fragile intermetallic compounds, as well as a low solidification range that limits the risk of solidification cracks.

The invention claimed is:

1. An assembly comprising:

a hairspring made of a paramagnetic alloy, and at least one fastening part including a collet, the collet having a first portion designed to come into contact with the hairspring and made of titanium, titanium alloy, tantalum, or tantalum alloy, wherein the first portion has two bearing surfaces, including a first bearing surface and a second bearing surface, separated by a slot, each of the first bearing surface and the second bearing surface coming into contact with the hairspring, wherein each of the first bearing surface and the second bearing surface is a bearing surface in contact with a same face of the hairspring, wherein the first and second bearing surfaces of the first portion of the collet are fastened to the hairspring by a laser welding, wherein the first bearing surface and the second bearing surface are outermost periphery surfaces of the collet in a radial direction from an axis of the collet.

2. The assembly as claimed in claim 1, wherein each of the bearing surfaces has, at least one of ends of the bearing surfaces in the direction of the height of the hairspring, a positioning shape extending perpendicular or substantially perpendicular to the respective bearing surface.

3. The assembly as claimed in claim 1, wherein each of the bearing surfaces has, at two of the ends of the bearing surfaces in the direction of a height of the hairspring, respectively a first positioning shape and a second positioning shape, the shapes extending perpendicular or substantially perpendicular to the respective bearing surface.

4. The assembly as claimed in claim 1, wherein the at least one fastening part includes a second portion designed to come into contact with a balance arbor.

5. The assembly as claimed in claim 1, wherein the bearing surfaces are arranged substantially perpendicular to a plane of the hairspring and together form an angle.

6. The assembly as claimed in claim 5, wherein the angle formed by the bearing surfaces is in a range of from 150° to 179° considered from an axis of the hairspring.

7. The assembly as claimed in claim 1, wherein the bearing surfaces are curved to form portions of a single cylinder of revolution or are made tangential to a single cylinder of revolution.

8. The assembly as claimed claim 7, wherein the cylinder of revolution is centered on an axis of the collet.

9. The assembly as claimed in claim 7, wherein the bearing surfaces are arranged substantially perpendicular to a plane of the spiral spring.

10. The assembly as claimed claim 1, wherein the collet includes at least one stop.

11. The assembly as claimed claim 10, wherein the collet includes from two to five stops, distributed angularly about an outer periphery of the collet.

12. The assembly as claimed in claim 11, wherein the stops are distributed regularly about the outer periphery of the collet.

13. A manufacturing method for an assembly as claimed in claim 1, the method including:

providing the collet, providing the hairspring, fastening the collet to the hairspring.

14. The manufacturing method as claimed in claim 13, wherein the fastening step is performed by laser welding.

15. A clockwork oscillator or clockwork movement or timepiece including an assembly as claimed in claim 1.

16. The assembly as claimed in claim 1, wherein the paramagnetic alloy of the hairspring includes at least one of the following elements: Nb, V, Ta, Ti, Zr and Hf.

17. The assembly as claimed in claim 16, wherein the paramagnetic alloy of the hairspring includes the elements Nb and Zr with between 5% and 25% by mass of Zr and an interstitial doping agent including oxygen.

18. The assembly as claimed in claim 1, wherein the first portion is made of grade 2 titanium or grade 5 titanium.

19. The assembly as claimed in claim 1, wherein the slot extends in the direction of a height of the hairspring over a height greater than the height of the hairspring.

20. The assembly as claimed in claim 19, wherein the slot is oriented substantially in the direction of the height of the hairspring.

21. The assembly as claimed in claim 1, wherein the bearing surfaces are arranged substantially perpendicular to a plane of the spiral spring.

22. The assembly as claimed in claim 1, wherein the slot is oriented substantially in a direction of a height of the hairspring.

* * * * *